Patented Jan. 12, 1954

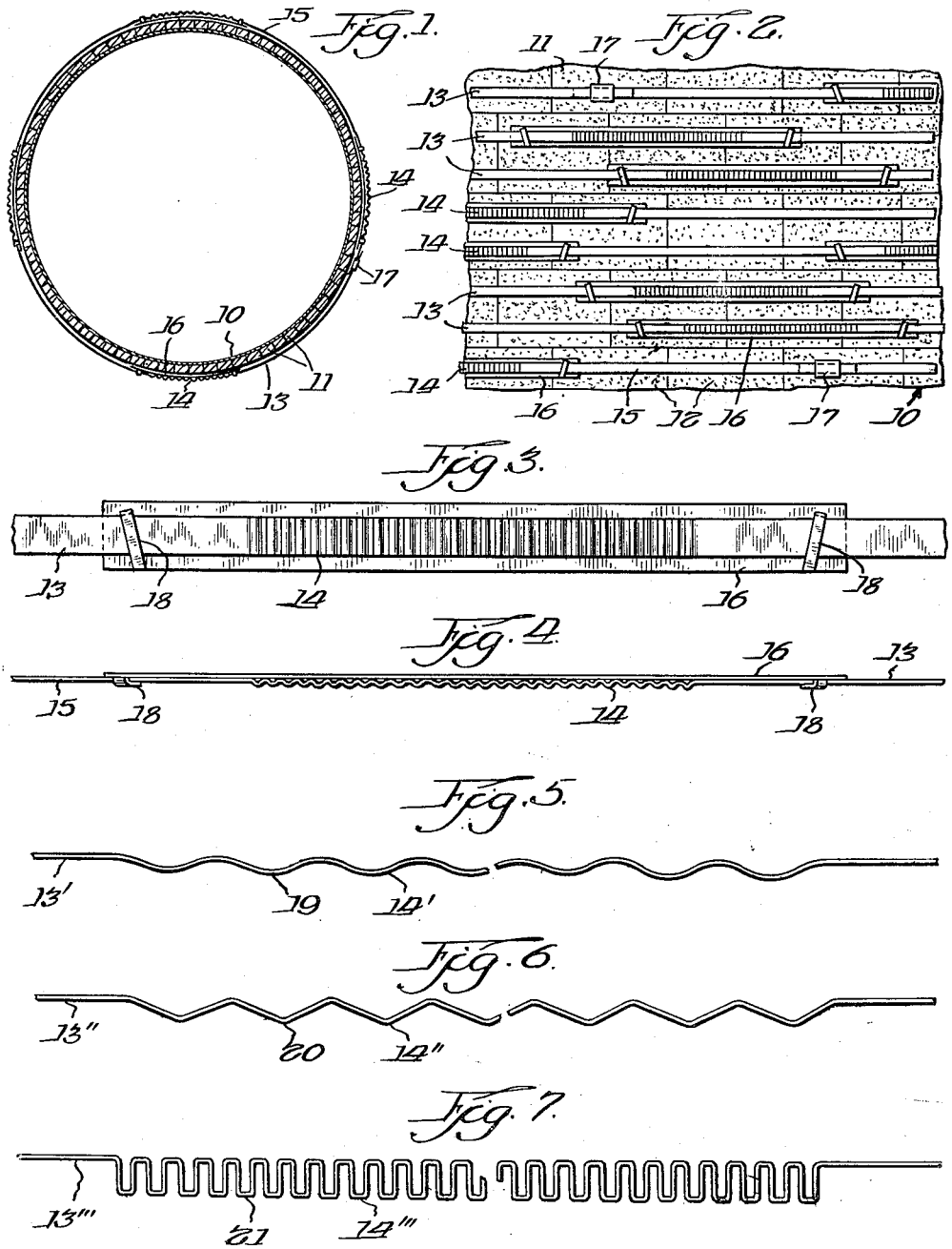

2,666,004

UNITED STATES PATENT OFFICE 2,666,004

STEEL STRAPPING AND SHIELD

John M. Gerrard, Melrose Park, Ill., assignor to A. J. Gerrard & Company, Melrose Park, Ill., a corporation of Illinois Application June 6, 1950, Serial No. 166,455

7 Claims. (Cl. 154—44)

This invention relates to steel strapping and a shield construction therefor, and, more particularly, to an expanded band in the form of an expanding and contracting steel strapping and shield construction for retaining insulation and/or structural members on tanks, vessels, and the like or similar constructions.

Recently, there has been a rapid advancement in the art of manufacturing insulation blocks and insulation substances, so that the previous methods for securing these insulation materials has become antiquated.

It is, therefore, a principal object of the invention to provide a new method of securing insulation members, and the like, to structures which expand and contract under various physical changes, for example—such as, changes of temperature.

Another object of the invention is to provide an improved method of affixing insulating blocks to a structure adapted to expand and contract under changes of temperature, such as used in the chemical and refinery field, wherein the temperature changes are substantially large.

Another object of the invention is to provide a novel building structure, including a support structure and insulation therefor, for withstanding expansion and contraction under cyclic changes of temperature.

Still another object of the invention is to provide an improved form of expander band for affixing structural members to a structure undergoing cyclic changes of temperature.

Another object of the invention is to provide an improved form of expander band provided with corrugated and uncorrugated sections, and which is adapted to expand and contract within a pre-determined range.

Another object of the invention is to provide an improved expander band which may be simply erected by tensioning of the band and clamping the band in position upon the structure, tension being obtained by the device for assembling the band in position.

Another object of the invention is to provide an improved expander band which is not contaminated by corrosive gases, and the like, to increase the life of the expander band.

Still another object of the invention is to provide an improved strap or expander band for erecting insulating material and the like to expand at an even rate therewith, and contract at an even rate, so that the pressure exerted against the insulation will be held as constant as possible.

A further object of the invention is to provide strapping with varying amplitudes and cycles or pitches to fit the particular expansion and contraction of each particular structure to which the strapping is applied.

A still further object of the invention is to provide an improved shield construction for the expander band to prevent the corrugations thereof, during the cyclic change of expansion and contraction, from destroying the insulating blocks, and the like, upon which the expander band or strapping is affixed.

Other objects and advantages will appear in the course of the specification, and with all of said objects and advantages in view, this invention consists in the several novel features of construction, arrangement, and parts hereinafter fully set forth and more particularly defined in the appended claims.

The invention is clearly illustrated in the drawing accompanying this specification, in which:

Fig. 1 is a plan view of the expander band of this invention applied about the periphery of an insulated tank construction, and the like shown in cross-section;

Fig. 2 is a partial view, in elevation, of the construction of Fig. 1 illustrating the expander band and shield therefor for affixing blocks of insulation;

Fig. 3 is a vertical elevation of an enlarged section of the expander band illustrating a corrugated section thereof and the shield therefor;

Fig. 4 is a plan view of the embodiment of Fig. 3;

Fig. 5 is an enlarged plan view similar to Fig. 4 of a modified form of a corrugated section of the expander band;

Fig. 6 is another embodiment of a corrugated section of the expander band; and

Fig. 7 is still another modification of a corrugated section of the expander band.

Referring to the drawing, which is merely illustrative of several forms of the present invention, there is illustrated a tank construction 10, such as used in the chemical and refinery field, provided with insulation 11 in the form of a series of blocks 12 positioned about the periphery of the vessel 10, as illustrated in Fig. 2. The insulation blocks are held in position by the improved strapping 13, as illustrated in Figs. 1 and 2, for affixing each row or section of insulation about the periphery of the vessel. Each expander band 13 is provided with a plurality of corrugated sections 14, and uncorrugated sections 15. A shield is positioned underneath each corrugated section and the ends of the expander band, after tensioning, are held in place by a clamp or seal 17.

Referring to Figs. 1 to 4, it is preferred to form the corrugated expander band 13 of alloy strapping or other suitable material in such a manner that each segment of each corrugation forms a minute spring which is capable of expanding from 0.0005 inch to 0.0065 inch, according to the environment of cyclic changes of temperature, to which the expander band is subjected. The strap must expand at an even rate with the insulation material, and must contract at an even rate, so that the pressure exerted against the insulation 13 in the form of the blocks 12, or other material, will be held as constant as possible.

It is also preferred to fabricate this strapping with varying amplitudes and cycles or pitches to fit the expansion and contraction of each particular tank or vessel. It is possible, by varying the amplitude and pitch, to reduce or increase the spring action of the expander band 13. It has been found that with an amplitude of one-quarter of an inch, as shown in the embodiment of Fig. 4, and a pitch or cycle of one-quarter of an inch, as shown in Figs. 3 and 4, there is an eighteen percent loss in footage. Where less spring action is required, the footage is increased by reducing the amplitude and increasing the pitch or cycle.

There may be an infinite variety of corrugations possible, and this variety may be further extended by alternating the corrugated sections 14 with the uncorrugated sections 15 of the expander band in a ratio of one-third, one-half, and two-thirds. By this is meant, for example, that a corrugated section, one unit in length, will have an uncorrugated section following which is three units in length.

In fabricating the expander band, it is preferred to use a metal which is limited to those that will take a permanent set and not fatigue in a short period of time. It has been found that half hard steel, half hard steel stainless, and half hard "Monel" are the most practical metals to retain this set.

Since this improved construction is particularly adapted for use in the chemical and refinery field, the surrounding air of chemical plants or refineries is very often contaminated with corrosive gases, which obviously would shorten the life of any less noble metal. Therefore, a preferred material from which it is contemplated fabricating the expander band is stainless steel; so-called Type 304, and "Monel." It has been found also that the above metals will normally not hold the "spring set" unless the material is of a half hard temper.

In order that the expander band may function properly, it has been found particularly desirable to also fabricate the expander band from metal strapping which may have a thickness within substantially the range of 0.016 inch to 0.028 inch.

It has been found in the fabrication of the spring-like expander band construction 13, that the following five essential points are necessary: (1) type of metal; (2) hardness of metal; (3) thickness and width of the metal; (4) varying the amplitude and cycles of the corrugations; and, (5) varying the interval of corrugation and plain metal. These various points have been carefully set out above, and the various ranges set forth within which an improved expander band may be fabricated in order to accomplish the various objects of the invention.

Referring to Figs. 1 to 4, inclusive, the shield 16 is sometimes required in order to prevent the segments of the corrugated sections 14 from acting like saw teeth during the cyclic change of expansion and contraction when the expander band is mounted over soft, porous, insulating blocks 12. The flexible shield 16 is preferably formed of metal, usually of thinner gauge than the expander band, extending underneath the length of the corrugation, as shown in Fig. 3, and supported and depending from the expander band at each end by means of a hook 18 struck out from the shield, as shown in Fig. 3, to provide a slot within which the uncorrugated portions of the expander band are positioned, as shown. It is preferred to assemble the shield on the expander band by hooking the hooks 18 over the expander band, as shown in Fig. 3. This prevents the shields from becoming detached from the expander band, for example, if the expander band should fail to return upon contraction, and also in the assembly of the expander bands upon the structure to prevent the shields from being disassembled in the assembly of the expander bands on the structure. It is preferred to form the shields 16 wider than the width of the expander band, usually in a ratio of one and one-half to one.

The shield has been found particularly desirable for use with insulation such as fiber glass and the like frangible forms of insulation, without which, the segmental portions of the corrugated section tends to destroy the surface of the fiber glass with the cyclic changes of temperature.

Fig. 5 illustrates a modified form of expander band 13' formed with corrugations 14' having modified, undulating, arcuate, corrugated segments 19.

Fig. 6 illustrates another modification in which the expander band 13" is provided with corrugated sections 14" having V-shaped segments or corrugations 20.

Fig. 7 illustrates another modified form of an expander band 13''' having corrugated sections 14''' provided by substantially U-shaped and rectangular shaped segments 21.

These modifications, as illustrated in Figs. 3 to 7, may be formed from spring-like strip metal in accordance with the five points which have been found to be essential, and as set forth above for fabricating an improved form of corrugated expander band.

In the erection of a structure utilizing the improved expander band of this invention, referring to Figs. 1 and 2 for example, the blocks of insulation 12 are assembled and erected about the periphery of the vessel 10, after which the expander band 13, together with the shields 16, is positioned about the periphery, and the clamp 17 is placed in position. The ends of the expander band are placed under tension with a band cutter and tensioning device of the type disclosed and claimed in Gerrard U. S. Patent No. 2,199,744, granted May 7, 1940. After the expander band has had sufficient tension applied to it, so that it conforms to the periphery of the insulation 11 and holds the insulation firmly against the structure 10, the clamp 17 is affixed with a suitable tool, and the extra end of the expander band is severed, as is well understood in the art. Another expander band 13 is then assembled in position, as shown in Fig. 2, so that one, two, or a plurality of expander bands may be applied for each section of insulation as the insulation is erected. The insulation may have suitable interlocking joints for aiding in the assembly and to prevent heat loss through the joints.

With the above assembly of insulation on a vessel, as described, the insulation and expander bands may undergo cyclic changes of temperature, wherein the expander bands may contract and expand with the changes in temperature, so that the pressure exerted against the insulation will be held as constant as possible, and without a permanent set being taken in the expander band, preventing the expander band from returning to its original position at the lowest temperature of the range.

From the above disclosure, it is obvious that there has been disclosed an improved form of expander band and method of applying a band, and the resultant structure therefrom, which is particularly adapted for use in applying insulation to structural vessels used in the chemical and refinery industries. Although having been disclosed with reference to these industries, it is also obvious that the construction is suitably adapted for the insulation of home water heaters, and the like, and for other adaptations which will occur to those skilled in the art without departing from the scope of the invention.

Having thus described this invention, it is obvious that various immaterial modifications may be made in the same without departing from the spirit of this invention; hence, it is not desired to be understood as limiting the invention to the exact form, construction, arrangement, and combination of parts herein shown and described, or uses mentioned.

What I claim as new and desire to secure by Letters Patent is:

1. A building structure, including a supporting structure and insulation therefor, for withstanding expansion and contraction under cyclic changes of temperature, comprising insulation assembled about the periphery of the structure, a plurality of metallic expander bands each provided with a series of corrugations alternating with uncorrugated portions extending circumferentially thereof, said bands being applied under a predetermined pressure about the peripheral surface of a section of the assembled insulation providing a primary stretch to the band and sealed in the stretched position whereby, as the expander bands expand and contract tension is distributed substantially equally throughout the length thereof.

2. In a building structure as defined in claim 1 wherein each of the metallic expander bands thereof comprises a corrugated section having a plurality of segments, each of said segments forming a minute spring formed within substantially the range 0.0005 inch to 0.0065 inch and adapted to expand and contract under changes of temperature.

3. In a building structure as defined in claim 2 wherein the thickness of the cross section of said metallic expander bands vary within the range of from 0.016 to 0.028 inch.

4. A building structure, including a supporting structure and insulation therefor, for withstanding expansion and contraction under cyclic changes of temperature, comprising insulation assembled about the periphery of the structure, a corrugated metallic expander band provided with a series of transverse corrugations extending longitudinally thereof, said band being applied about the peripheral surface of a section of the assembled insulation by tensioning and then clamping the expander band providing a primary stretch to said band, and a shield carried by said expander band positioned between said band and said insulation and adapted to be applied subsequent to the band.

5. A metal expander band for affixing structural building members to a supporting building structure undergoing cyclic changes of temperature comprising, in combination, a corrugated section and an uncorrugated section, a shield adapted to be mounted between the corrugated section and the structural members, and means for mounting the shield on the expander band.

6. A metallic expander band for affixing structural building members to a supporting building structure undergoing cyclic physical changes comprising, in combination, a corrugated section and an uncorrugated section, a shield adapted to be mounted between the corrugated section and the structural members, means for detachably mounting the shield on the expander band and adapted to be applied subsequent to the latter, said means comprising struck-out portions from the shield adapted to engage the uncorrugated sections of the band contiguous to the ends of the corrugated sections.

7. An expander band for affixing structural members to a structure adapted to expand and contract due to physical changes in the structure, comprising a corrugated section having a plurality of segments, each of said segments forming a minute spring formed within substantially the range 0.0005 inch to 0.0065 inch and adapted to expand and contract under changes of temperature, said expander band having a cross-sectional thickness varying within the range of from 0.016 to 0.028 inch.

JOHN M. GERRARD.

References Cited in the file of this patent

UNITED STATES PATENTS

| Number | Name | Date |
|---|---|---|
| 221,655 | House et al. | Nov. 11, 1879 |
| 742,689 | Lord | Oct. 27, 1903 |
| 1,351,772 | Libbey | Sept. 7, 1920 |
| 1,580,413 | Cover | Apr. 13, 1926 |
| 1,592,479 | Williams | July 13, 1926 |
| 1,778,955 | Morrill | Oct. 21, 1930 |
| 2,324,181 | Tulien | July 13, 1943 |

FOREIGN PATENTS

| Number | Country | Date |
|---|---|---|
| 541,951 | Great Britain | Dec. 18, 1941 |